G. H. LARSON.
END GATE FASTENER.
APPLICATION FILED JULY 2, 1917.

1,269,615.

Patented June 18, 1918.

Inventor
G. H. Larson.

Witnesses
E. L. Higgins
E. L. Mueller

By Chandler & Chandler
Attorneys

UNITED STATES PATENT OFFICE.

GEORGE H. LARSON, OF AURELIA, IOWA.

END-GATE FASTENER.

1,269,615.      Specification of Letters Patent.      Patented June 18, 1918.

Application filed July 2, 1917. Serial No. 178,239.

*To all whom it may concern:*

Be it known that I, GEORGE H. LARSON, a citizen of the United States, residing at Aurelia, in the county of Cherokee, State of Iowa, have invented certain new and useful Improvements in End-Gate Fasteners; and I do hereby declare the following to be a full, clear, and exact description of the invention, such as will enable others skilled in the art to which it appertains to make and use the same.

This invention is an improvement in end gates for wagons and has particular reference to a fastener therefor.

An object of the invention is to provide an improved construction wherein the end gate will be securely retained in locked position and prevented from rattling and which may be easily and quickly opened to permit of the contents of the body being emptied.

Another object is to provide a fastener of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying, wherein:—

Figure 1:
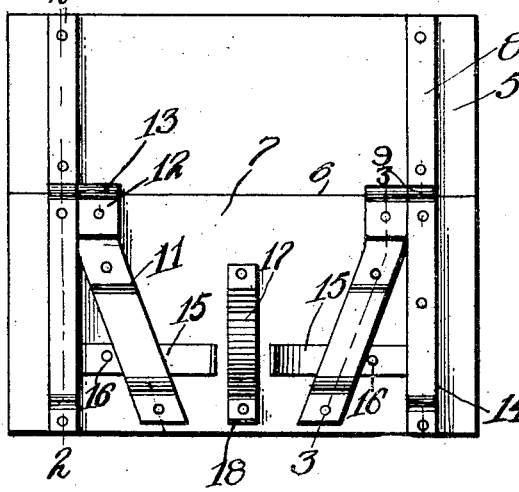
Figure 1 is a fragmentary rear elevation of a wagon and end gate showing the fastener applied thereto and in locked position.
Figure 2:
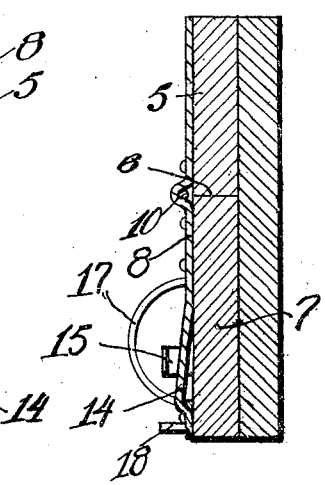
Fig. 2 is a section on the line 2—2 of Fig. 1.
Figure 3:
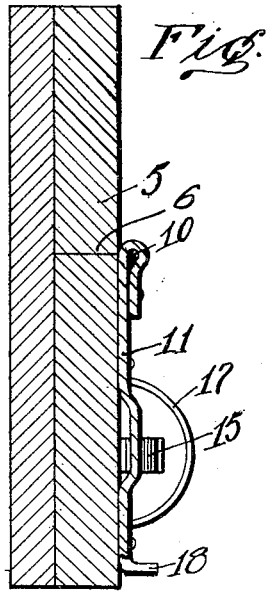
Fig. 3 is a section on the line 3—3 of Fig. 1 showing one of the latches of the fastener in locked position.
Figure 4:
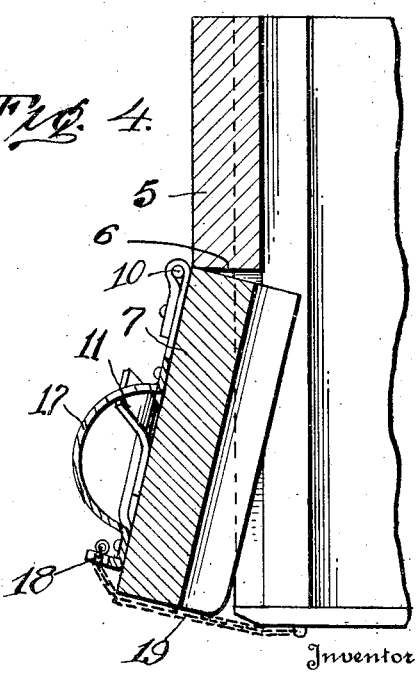
Fig. 4 is a central vertical section through the end gate showing the same in partially opened position.

In the drawing the numeral 5 indicates generally the rear end of a wagon body adapted to contain grain or the like and provided in its rear end with an opening 6 adapted to be closed by the end gate 7 which is pivotally mounted in said opening.

On each side of the opening 6 there is preferably arranged a vertical strap 8 crimped intermediate its ends to provide a bearing 9 in which is mounted one end of a pintle or pivot pin 10. Preferably secured to the end gate 7 adjacent each vertical edge is a supporting strap 11 having one end bent upon itself as indicated at 12 to provide a bearing 13 for receiving the other end of the adjacent pintle 10 whereby the end gate is hingedly mounted in the opening 6 and flush with the end of the wagon body.

Each of the strips 8 adjacent the lower end thereof is bent to provide an inclined portion 14 forming a tapered slot or opening between the same and the adjacent face of the end of the wagon body, the reduced end of said slot being uppermost. Each of the supporting straps 11 is spaced slightly intermediate its ends from the adjacent face of the end gate so as to accommodate therebetween a latch 15 pivoted at 16 adjacent its latch end so that the inner end of said latch will overbalance the outer end thereof and normally retain said outer end in latching position beneath the inclined portion 14 and binding between the same and the adjacent face of the end of the wagon body. This binding action of the outer end of the latch 15 in the tapered slot or opening formed by the inclined portion 14 will prevent any rattling of the end gate when the same is in locked position. In order to open the gate the inner ends of the latches 15 are both swung upwardly until the outer ends thereof are released from engagement with the straps 8 whereupon the inner ends of said latches will bind between the end gate and the straps 11 and thus be frictionally retained in unlocking position.

The end gate 7 is provided with a handle 17 having one end 18 thereof extended and bifurcated to receive the free end of a chain 19 which is extended beneath the end gate and secured at its other end to the wagon body. This chain is only employed when it is desired to limit the outward swing of the end gate so that the amount of other material being emptied from the wagon body may be regulated.

What is claimed is:—

The combination of a wagon body having an opening in one end, an end gate mounted in said opening, vertical straps secured to said end of the wagon body and bent intermediate their ends to provide bearings, other straps carried by the end gate and having their ends bent upon themselves to provide bearings alined with the first named bearings, pintles engaging in said bearings for pivotally mounting the end gate in position, the lower ends of said vertical straps being inclined to space the same from the end of the wagon body whereby to form tapering slots, and latches extending
5 beneath the second named straps and pivoted to said end gate the outer ends of said latches being adapted to bind in the reduced ends of said tapering openings formed by said vertical straps and the end of the wagon body.

In testimony whereof, I affix my signature in the presence of two witnesses.

GEORGE H. LARSON.

Witnesses:
A. J. WHINNEY,
OLIVE A. JOHNSON.